US006670725B2

(12) United States Patent
Fitzgibbon et al.

(10) Patent No.: US 6,670,725 B2
(45) Date of Patent: Dec. 30, 2003

(54) POWER APPARATUS FOR INTERMITTENTLY POWERED EQUIPMENT

(75) Inventors: James J. Fitzgibbon, Batavia, IL (US); Edward Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 163 days.

(21) Appl. No.: 10/054,664

(22) Filed: Nov. 13, 2001

(65) Prior Publication Data

US 2003/0090157 A1 May 15, 2003

(51) Int. Cl.$^7$ ................................. H02J 7/00
(52) U.S. Cl. ........................................ 307/66
(58) Field of Search .................. 307/46, 48, 64, 307/66; 340/5.2, 5.21–5.25; 49/275, 358

(56) References Cited

U.S. PATENT DOCUMENTS 6,025,785 A * 2/2000 Farris et al. ............... 340/5.23
6,414,587 B1 * 7/2002 Fitzgibbon ................. 340/5.22
6,597,138 B2 * 7/2003 Fitzgibbon ................. 318/434

* cited by examiner

Primary Examiner—Matthew V. Nguyen
(74) Attorney, Agent, or Firm—Fitch, Even, Tabin & Flannery

(57) ABSTRACT

A back-up power supply for supplying operational power to a barrier movement apparatus when a mains supply of power is not present, including an enabling circuitry responsive to transmitted security codes for connecting operational power from the back-up power supply to the barrier movement apparatus. The back-up power supply includes a mains power input; a storage apparatus for storing power from the mains supply; converting apparatus for converting power stored by the storage apparatus into substitute mains power; and a control apparatus responsive to user generated request signals for enabling the converting apparatus to convert stored power into substitute mains power for use by the equipment. In accordance with another aspect of the invention, when a controller of a barrier movement apparatus identifies that a power reduction by a substitute power supply was caused by the barrier striking an obstruction, the controller directs the opening of the barrier, away from the obstruction when power is returned.

8 Claims, 3 Drawing Sheets

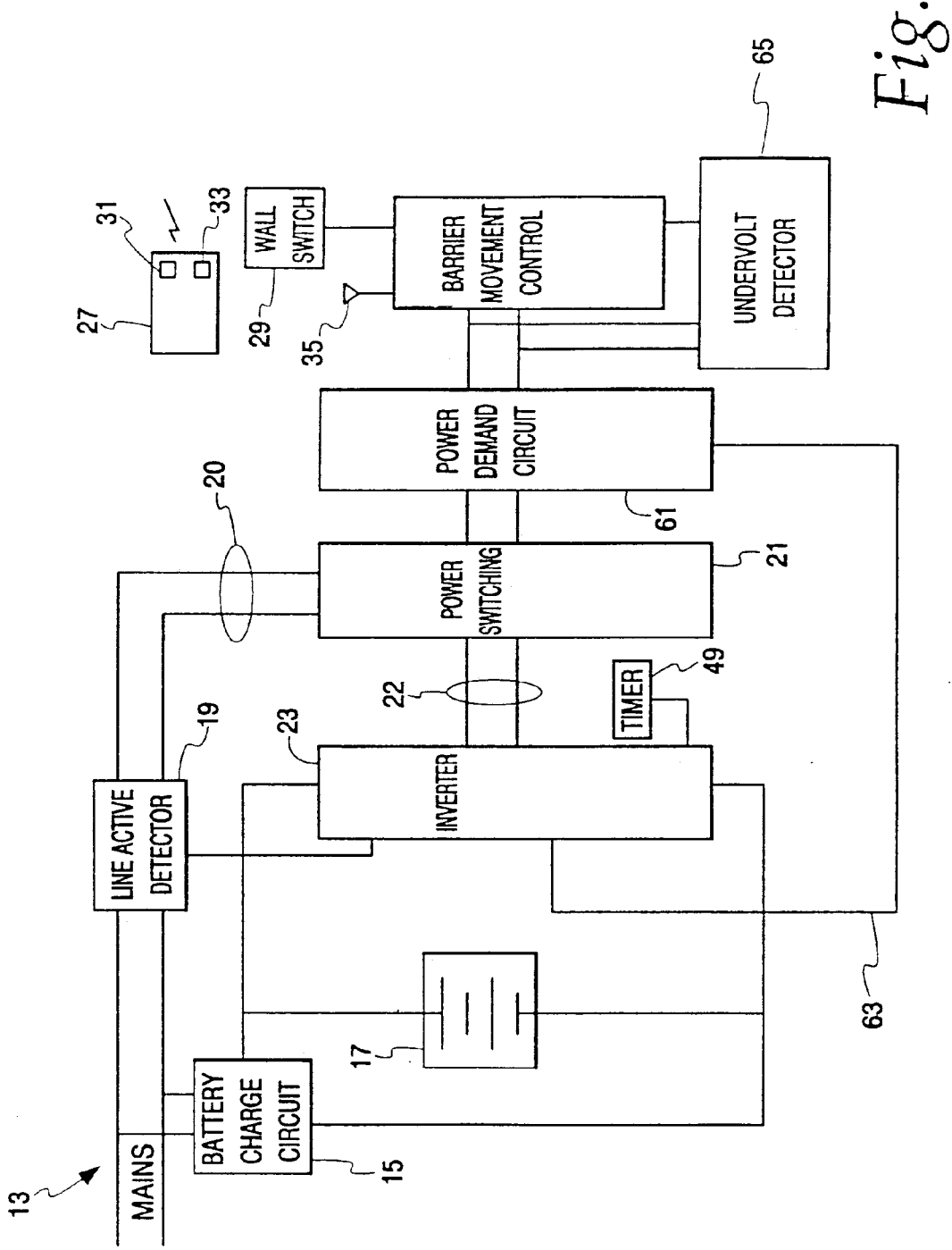

POWER APPARATUS FOR INTERMITTENTLY POWERED EQUIPMENT

BACKGROUND OF THE INVENTION

The present invention relates to backup power supplies and more particularly to the use of such with intermittently powered equipment.

Backup power supplies, sometimes called uninterruptable power supplies, are used to provide operational electrical power to equipment in times that the normal commercial or mains power system is not functioning. Backup power supplies generally comprise energy storage apparatus, such as batteries, connected to be charged from a mains power supply such as the 60 HZ, 120V power prevalent in the U.S. A power switching part of the backup power supply also connects the mains power directly to the equipment to be used. When a mains power failure occurs a conversion or invertor portion of the power supply is enabled to produce mains power e.g., 60 HZ, 120V from the stored power and the substitute power from the conversion portion is connected via the power switching part to the equipment to be powered. In this way the equipment can be powered during a mains power outage until the power stored by the backup power supply is used up or mains power is restored.

The power conversion apparatus of a backup power supply may consist of semiconductor switching circuitry connected to an input of a transformer. When the convertor is enabled due to mains power outage, an oscillator of predetermined frequency begins to drive the semiconductor switches to produce current pulses in the transformer. The equipment connected to the transformer output then has a continuing source of power for operation even though the mains power has stopped. The operations of the oscillator and semiconductor switches consume a significant amount of power from the power storage device whether or not the connected equipment requires power. Thus, the operation of the power converter is a backup power supply will consume significant stored power shortening the time that backup power is available, whether or not the equipment to be powered is actually taking power from the power supply. Such inefficiency is particularly problematic when the equipment to be powered is infrequently powered.

The use of backup power supply for example, with a barrier movement system, such as a garage door operator, provides advantages of barrier movement during power outage however, given the infrequent need for power the inefficiencies of the power convertor can needlessly shorten the period during which substitute power is available.

Additionally, backup power supplies frequently include protection circuitry which monitors the output power (current) of the supply and reduces the output power to prevent sustained overload. Such power reduction may involve reduction of output voltage or the elimination of one or more oscillator cycles to eliminate one or more current pulses to the output of the transformer. These steps at output power reduction may be responded to by the load as a power shutoff. When the equipment being powered includes an intelligent controller, such as a microprocessor, the controller may interpret the power reduction as a shut down and "forget" action being performed. This could create a problem when the power supply is used with a barrier movement apparatus and a power reduction by the power supply is initiated by an increased power demand upon the barrier striking an unexpected obstruction. When power is again restored, after the controller has lost knowledge of its prior activity, the barrier could be moved in a manner harmful to the barrier or the obstruction.

SUMMARY OF THE INVENTION

In accordance with one aspect of the present invention a substitute power supply includes portions which are not enabled by a cessation of mains power until a user generated need for power is received.

In accordance with another aspect of the invention, when a controller of a barrier movement apparatus identifies that a power reduction by a substitute power supply was caused by the barrier striking an obstruction, the controller directs the opening of the barrier, away from the obstruction when power is returned.

BRIEF DESCRIPTION OF THE DRAWINGS

FIG. 3 is a block diagram of a combined system in which power generation for the barrier movement controller is regulated by a power demand sensing circuit.

DESCRIPTION

Figure 1:
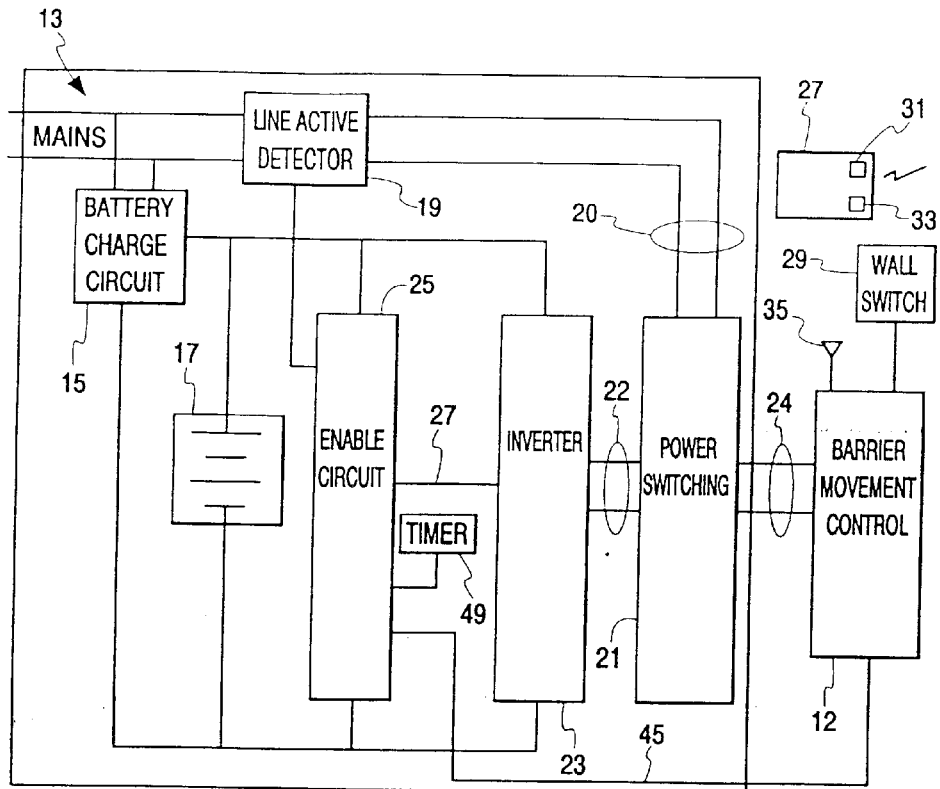
FIG. 1 is a block diagram of a system including a backup power supply in conjunction with a barrier movement system.

FIG. 1 is a block diagram of a combined system in which a backup power supply or uninterruptable power system 11 is connected to provide operating power to a barrier movement control 12. Barrier movement control 12 may, for example, be a garage door opening system of the type described in U.S. Pat. No. 6,025,785.

Backup power supply 11 is connected, at an input port 13, to a mains voltage supply which provides, for example, 120V at 60 HZ, the normal U.S. electrical power. A battery charger circuit 15 of conventional design is connected to the mains voltage and charges a battery 17 which will be the source of power during interruption of the mains voltage. The mains voltage is connected via a line active detector 19 and conductors 20 to a power switching unit 21. The power switching unit is of conventional design and includes switching circuitry for connecting either the mains voltage supplied on conductors 20 or substitute mains voltage on conductors 22 to barrier movement controller 12. The substitute mains voltage is supplied to conductors 22 by an invertor 23 which is connected to receive power from battery 17 and has access to the power stored thereby. Invertor 23 may also be of conventional design which generally includes an oscillator operating at a predetermined frequency and driven circuitry for switching battery power through a transformer the output of which is the substitute mains voltage on conductors 22.

Figure 4:
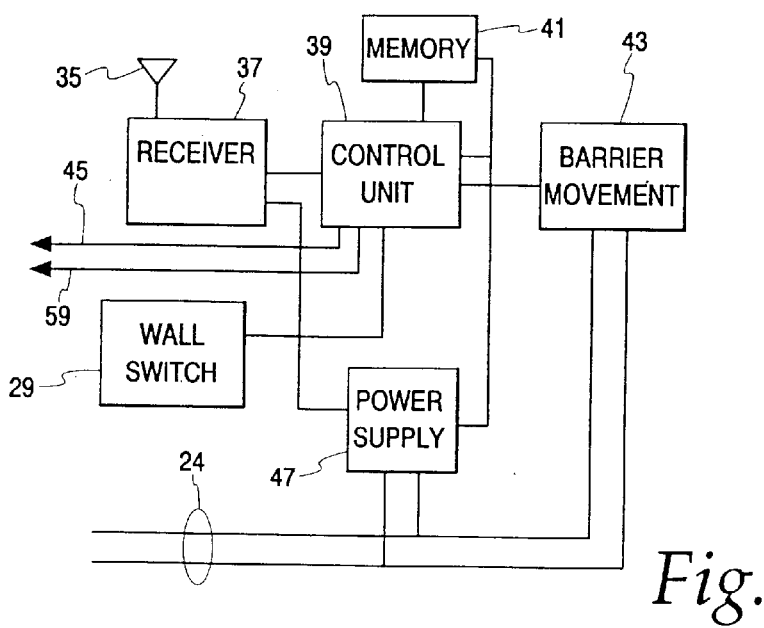
FIG. 4 is a block diagram of a barrier movement controller.

During normal operation, when mains voltage is present at input 13, power switching unit 21 is controlled to connect the voltage from input 13 to the barrier movement controller 12. Alternatively, when line active detector 19 senses an interruption of mains voltage at terminal 13 a signal is sent to an enable circuit 25 and power switch 21 is controlled to connect substitute mains power, when present, from invertor 23 and conductors 22 to barrier movement control 12. By operation discussed below, no such substitute power is present until additional signals are provided to the enable circuit 25. In the present embodiment such additional signals are generated by the barrier movement control 12. Barrier movement controller 12 responds to user requests by opening and closing a barrier such as a garage door. In the embodiment of FIG. 1, user requests are directed to the barrier movement control 12 by a portable rf transmitter 27 and a wired wall control unit 29. As is described in detail in the aforementioned U.S. Pat. No. 6,025,785, a user can press a button 31 on transmitter 27 to cause a security code to be rf transmitted. The barrier movement control 12, which is shown in block diagram form in FIG. 4, includes an antenna 35 which is connected to an rf receiver 37 which detects received rf security codes and transmits the security code to a control unit 39. Control unit 39, which may include a programmed microprocessor is connected to a memory 41 for storing representations of previously learned security codes. Control unit 39 compares received security codes with stored security codes and when a proper correlation is present the barrier mover 43 is enabled to move a barrier (not shown). The barrier mover 43 may include an electrical motor in the ½ horsepower range and accordingly, requires significant mains power from the supply connected to conductor 24. The user may also request movement of the barrier by pressing a wall switch 29 which is connected to control unit 39. When a wall switch 29 signal is detected, control unit 39 directs barrier mover 43 to move the barrier. The barrier movement control 12 also includes a power supply 47 which receives mains power from conductor 24 and converts the power so received into appropriate power for receiver 37, control unit 39, and memory 41. Advantageously power supply 47 may include a batter backup so that functions can continue by the receiver 37, control unit 39 and memory 41 during periods that mains power is not present. As will be discussed below, such batter backup is not required.

When mains power at input 13 has ceased, all substitute mains power to control and run the system is drawn from battery 17. The present apparatus includes arrangements for intelligently enabling and disabling the invertor 23 to provide substitute power when needed in response to a user request. When a user generates an appropriate request signal from transmitter 27 or wall control 29 at a time when mains power is not present the invertor 23 is enabled to provide the necessary substitute mains power to barrier movement control 12.

When no mains voltage is present at input 13 line detector 19 sends a signal indicating such to enable circuit 25. In the present embodiment this primes the enable circuit 25 to send an enable signal to invertor 23, but no such enable signal is in fact sent. When barrier movement control 12 receives a user request from transmitter 27 or wall control 29 control unit 39 validates the request as needed and sends a power enable signal on conductor 45 to enable circuit 25 of the substitute power supply 11. Enable circuit 25 responds to the loss of power signal from line active detector 19 and the power enable signal on conductor 45 by sending an enable signal on conductor 27 to power invertor 23. As discussed above, power invertor 23 responds to the enable signal by generating the substitute mains power on conductor 22. In order to further conserve power lost due to unneeded operation of the invertor 23 a timer 49 is included in the system to remove the invertor enable signal on conductor 27. As shown in FIG. 1 timer 49 is connected to enable circuit 25 and begins timing at the beginning of the enable signal on conductor 27. When the timer times out, at for example 20 seconds, the invertor enable signal on conductor 27 is inhibited and will not be regenerated until a subsequent request is received from barrier movement control 12. It should be mentioned that s separate timing circuit is shown in the figures of this application, however, the timer may also be implemented by software controlling the operation of the substitute power supply 11.

Figure 2:
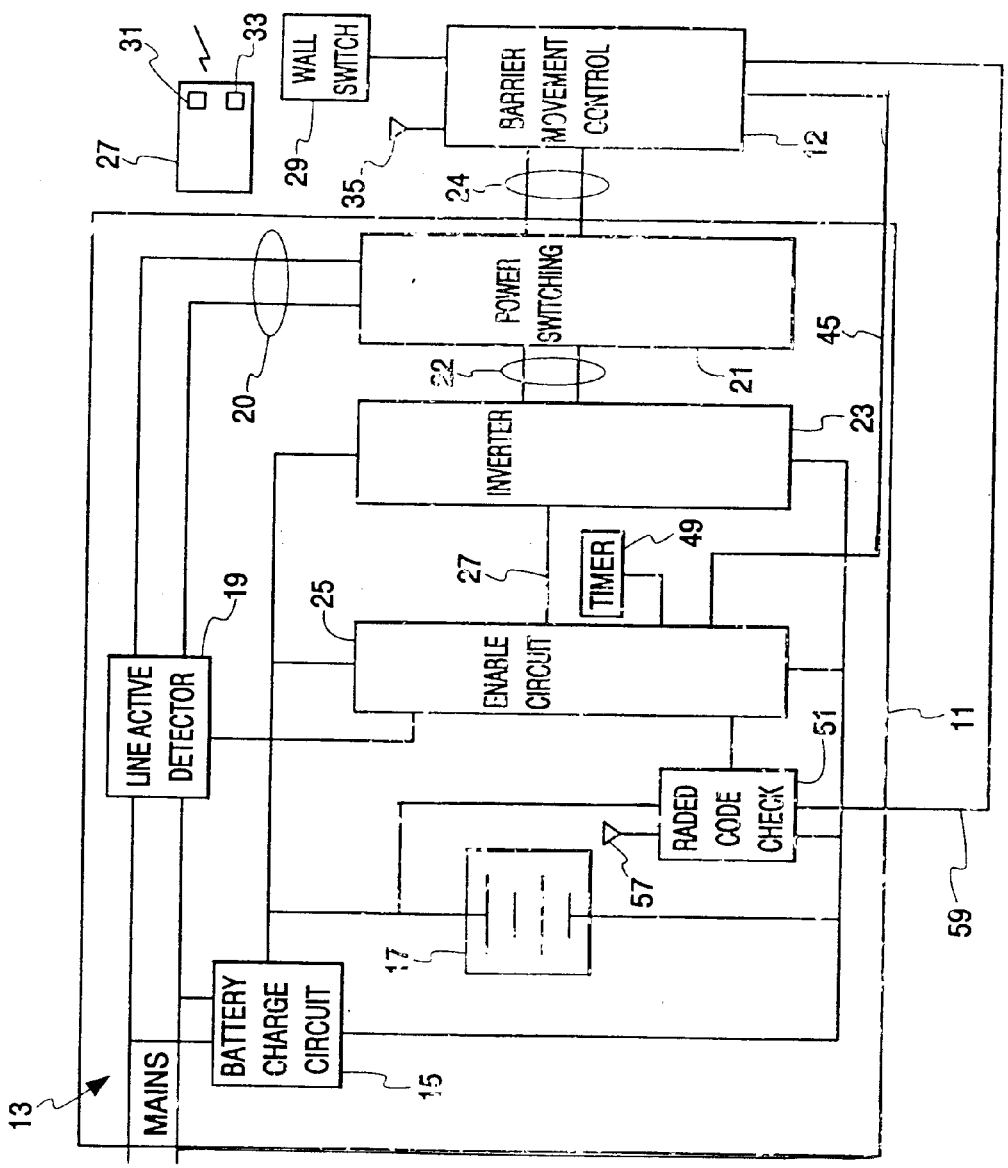
FIG. 2 is a block diagram of a combined system in which the backup power supply includes a security code receiver.

FIG. 2 is a block diagram of another embodiment in which the substitute power supply 11 includes a radio receiver and code check circuit 51 which can be used to enable the invertor. Radio receiver 51 includes a microprocessor and memory to control the security code reception and validation process. A learn button 53 is included with radio receiver 51 which, when pressed, initiates a code learning sequence in which a code received from a transmitter 27 will be stored in the memory of the radio circuitry. Such code learning operation is known in the circuitry. After one or more codes have been learned by the receiver 51 the operational mode is entered in which received security codes are compared to stored codes and the invertor 23 will be enabled by a signal on conductor 27 when a received code corresponds to a stored code.

The codes stored in receiver may be the same as the codes stored in the barrier movement control 12 or they may be different. When the same code is stored in both, a single transmission from transmitter 27 will activate both barrier movement and the power needed for moving the barrier. When the same codes are to be used in both the substitute power supply 11 and barrier movement control 12 they can be individually taught to each. Also the embodiment of FIG. 2 includes a data communications link 59 which permits data communication between the receiver 51 and control unit 39. The security codes to be stored by receiver 51 may be downloaded from the memory 41 of barrier movement control 12 via the data link 59. In this way a synchronized set of codes can be present in the memories of both units.

The embodiment of FIG. 2 can also be used with different codes being stored in the memories of the substitute power supply and the barrier movement control 12. For example, a code corresponding to button 33 of transmitter 27 could be taught to receiver 51 and a code corresponding to button could be taught to the barrier movement control 12. When the barrier is to be moved, button 33 is first pressed to which substitute power supply 11 responds by supplying substitute mains power to the barrier movement control 12. The button 31 is then pressed and the barrier movement control will be enabled to use the substitute power from the substitute power supply to move the barrier. Enabling the power supply first would allow the use of the barrier movement control 12 when no battery backup is available for the power supply of the barrier movement control.

In the preceding embodiment the invertor 23 was enabled by direct signaling from the user from the wall switch 29 or transmitter 27. FIG. 3 represents an embodiment in which the substitute power supply is enabled in response to indirect requests from the user. The apparatus of FIG. 3 includes power demand sensing circuit 61 which senses the input power demand of the barrier movement control 12. When no mains power is present at input 13 power demand sensing circuit detects the demand for power by the barrier movement control 12 and generates a power control signal on a conductor 63 representing the power demanded. During periods when no request for barrier movement is received the power control signal represents low power which is just enough to power the control unit 39, receiver 37 and memory 41 of the barrier movement control 12. Little power from battery 17 is lost due to inefficiencies when the invertor operates in the low power mode. When the barrier movement control receives an rf or hard wired request to move the barrier the demand for high power is detected by the power demand sensing circuit 61 and the power control signal on conductor 63 is changed to represent the new high power demand. Invertor 25 responds to the high power request signal by generating full output power on conductors 22 which is available for use to move the barrier. The timer 49 returns the invertor to low power output after the passage of a predetermined amount of time which might be, for example, 20 seconds. As before, the time out of timer 49 should permit sufficient time to fully open or fully close the barrier.

Substitute power supplies generally include over current or over power sensing capability which protects the power supply. When too much power demand is sensed the over power sensing capability reduces the power output by reducing output voltage or by omitting several voltage cycles (pulses) from the e.g., 60 HZ, output power. Such over power demand might be detected by the substitute power supply when a moving barrier has encountered an obstruction and is pushing against it. Should the power supply shut down at this point the barrier reversing capability which is standard on many barrier movement controls, might not be enabled. To protect against such failure to reverse, the embodiment of FIG. 3 includes methods and apparatus which sense power shut down by the power supply and assure that any re-powering of the barrier movement control will result in a reversing of the barrier.

FIG. 3 includes an under voltage detector 65 which detects a reduced output voltage or missing cycles by the substitute power supply. When either of these conditions is sensed, a signal is sent to barrier movement control to identify the condition. If the condition occurs while the barrier is being moved an "immediate reverse" condition is written into non-volatile storage of the barrier operator. Upon power up by the power supply, barrier movement control 12 begins operation, reads the stored "immediate reverse" condition, and controls the barrier movement control to reverse the direction of door travel to free whatever obstruction was encountered. Given that the voltage reduction or cycle elimination is brief, as is normally the situation, such immediate obstruction reversal can be completed much as the barrier operator would have done without the power outage.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention. By way of example, the transmitter and receivers of the disclosed embodiment are controlled by programmed microcontrollers. The controllers could be implemented as application specific integrated circuits within the scope of the present invention.

What is claimed is:

1. In combination:
   a barrier movement apparatus for receiving operational power and responsive to security codes for opening and closing a barrier movement apparatus;
   a back-up power supply for supplying operational power when a mains supply of power is not present;
   enabling circuitry responsive to transmitted security codes for connecting operational power from the back-up power supply to the barrier movement apparatus.

2. The combination of claim 1 wherein the barrier movement apparatus comprises a receiver for receiving transmitted security codes and for comparing received security codes with security codes stored by the receiver.

3. The combination of claim 2 wherein the backup power supply comprises a receiver for receiving transmitted security codes and for comparing received security codes with security codes stored by the back-up power supply.

4. The combination of claim 3 comprising apparatus for synchronizing the security codes stored by the back-up power supply with security codes stored by the receiver of the barrier movement apparatus.

5. The combination of claim 2 wherein the receiver of the barrier movement apparatus comprises a learn mode of operation for learning and storing security codes.

6. The combination of claim 3 wherein the receiver of the back-up power supply comprises a learn mode of operation for learning and storing security codes.

7. In combination:
   a backup power supply for producing backup operational electrical power;
   a barrier movement apparatus for receiving back-up operational power from the back-up power supply and moving a barrier using the back-up power;
   back-up power sensing apparatus for sensing a cessation of back-up power during barrier movement and for opening the barrier upon re-establishment of back-up power.

8. The combination of claim 7 wherein the back-up power supply intermittently ceases generation of back-up operational power.

* * * * *